US007813755B2

(12) United States Patent
Ochi et al.

(10) Patent No.: US 7,813,755 B2
(45) Date of Patent: Oct. 12, 2010

(54) ANTENNA DEVICE

(75) Inventors: Masaaki Ochi, Osaka (JP); Hiroshi Deguchi, Osaka (JP)

(73) Assignee: Panasonic Corporation, Osaka (JP)

(*) Notice: Subject to any disclaimer, the term of this patent is extended or adjusted under 35 U.S.C. 154(b) by 516 days.

(21) Appl. No.: 11/905,647

(22) Filed: Oct. 3, 2007

(65) Prior Publication Data

US 2008/0085733 A1 Apr. 10, 2008

(30) Foreign Application Priority Data

Oct. 10, 2006 (JP) ............................ 2006-276224
Nov. 14, 2006 (JP) ............................ 2006-307440

(51) Int. Cl.
*H04B 7/00* (2006.01)
*H04Q 7/20* (2006.01)

(52) U.S. Cl. ................ 455/522; 455/127.1; 455/343.3; 455/575.9; 340/572.7; 340/693.1; 340/5.72

(58) Field of Classification Search ............. 455/127.5, 455/574, 343.2, 343.3, 522.91, 127.1, 345, 455/352, 575.9; 340/426.17, 572.8, 5.61, 340/426.16, 5.72, 572.7, 693.1, 693.3
See application file for complete search history.

(56) References Cited

U.S. PATENT DOCUMENTS 6,100,603 A * 8/2000 Gold ........................ 307/10.2
6,816,081 B1 * 11/2004 Okada et al. ................ 370/462
7,170,419 B2 * 1/2007 Masui ........................ 340/692
2004/0264620 A1 * 12/2004 Tanaka ....................... 375/375
2006/0077037 A1 * 4/2006 Luo et al. .................. 340/5.72
2006/0238296 A1 * 10/2006 Konno ....................... 340/5.61
2007/0152833 A1 * 7/2007 Kaplan et al. ............ 340/572.8
2009/0017781 A1 * 1/2009 Fujii ....................... 455/127.1

FOREIGN PATENT DOCUMENTS

JP 2002-047835 2/2002

* cited by examiner

*Primary Examiner*—Sujatha Sharma
(74) *Attorney, Agent, or Firm*—McDermott Will & Emery LLP

(57) ABSTRACT

An antenna device includes: a transmitting unit which is connected to a control unit of an in-vehicle device mounted at a vehicle; and a transmission antenna connected to the transmitting unit. The transmitting unit operates the transmission antenna based on a binary signal and a carrier signal from the control unit. The transmitting unit includes: a duty ratio controller that modifies the binary signal to a duty ratio signal having a prescribed duty ratio and outputs the duty ratio signal; and a driving circuit that supplies an energizing current to the transmission antenna based on the carrier signal. The duty ratio controller changes intensity of the signal transmitted from the transmission antenna by changing the energizing current according to the duty ratio signal so as to form a desired communication range.

15 Claims, 9 Drawing Sheets

ANTENNA DEVICE

BACKGROUND OF THE INVENTION

1. Field of the Invention

The present invention relates to an antenna device of an in-vehicle device that is used in a communication system for performing unlock/lock or the like of a vehicle door between an in-vehicle device mounted at the vehicle and a portable device carried with a user. More specifically, the present invention relates to an antenna device that forms an arrival range (hereinafter, referred to as a communication range) of a transmission request signal that is transmitted in order to detect the existence of the portable device.

2. Description of the Related Art

Recently, there is popularized so-called, a smart entry system for performing unlock and lock or the like of a vehicle door only when a user approaches the vehicle or departs from the vehicle while carrying a potable device. Because the smart entry system can unlock and lock the vehicle door without a mechanical key, it is excellent in convenience.

According to this system, the in-vehicle device mounted at the vehicle outputs a transmission request signal through an antenna device. The portable device that receives this transmission request signal sends a reply signal to the in-vehicle device. The in-vehicle device that receives the reply signal controls a door actuator to unlock and lock the vehicle door.

The above-mentioned in-vehicle device is provided with a plurality of antenna devices. The antenna devices include:

an antenna device having a transmission antenna for an outside of the vehicle that is disposed at a transmitting unit and, for example, in a door handle of each vehicle door; and an antenna device having a transmission antenna for an inside of the door that is disposed in the vicinity of the transmitting unit and, for example, an instrument panel.

The transmitting unit is driven by a control unit of the in-vehicle device in the antenna device. The transmitting unit outputs the transmission request signal to a predetermined communication range through the transmission antenna.

Formation of the communication range in a conventional antenna device used in this system will be demonstrated with reference to FIG. 8 and FIG. 9.

FIG. 8 is a block diagram of the conventional antenna device. FIG. 9 is waveform diagrams demonstrating an operation of the conventional antenna device.

Referring to FIG. 8, in transmitting unit 51 of antenna device 50, binary signal Sa is input from a control unit of an in-vehicle device (not shown) to modulation unit 52 formed with an AND circuit through input terminal 56, and carrier signal Sb is input from the control unit of the in-vehicle device to modulation unit 52 through input terminal 54. Binary signal Sa is a signal having a duty ratio of 50% that repeats High (H)/Low (L) shown in FIG. 9. Carrier signal Sb is a carrier signal that forms a pulse string shown in FIG. 9. Modulation unit 52 modulates carrier signal Sb by binary signal Sa and outputs modulated signal Sf shown in FIG. 9.

In FIG. 8, driving circuit 57 is formed with connecting in series a pair of power transistors between power supply Vd and earth (GND). First power transistor 121 on power supply Vd side is P channel FET, and second power transistor 122 on the GND side is N channel FET. Moreover, first power transistor 121 and second power transistor 122 are provided with parasitic diodes 121*a* and 122*a* in parallel, respectively.

Modulated signal Sf is input from modulation unit 52 to first power transistor 121 and second power transistor 122 of driving circuit 57, respectively.

In FIG. 8, transmission antenna 55 is formed so that coil 55*a* and capacitor 55*b* is connected to each other in series. One end of transmission antenna 55 is connected to a middle point 124 between first power transistor 121 and second power transistor 122 through wiring 152, terminal 58, and resistance 53 which is disposed at transmitting unit 51. The other end of transmission antenna 55 is connected to GND on the circuit side through wiring 154 and terminal 59. That is, transmission antenna 55 is connected to second power transistor 122 in parallel.

Resistance value Ra of resistance 53, inductance La of coil 55*a* and capacitance Ca of capacitor 55*b* are referred to as antenna constants. Transmission antenna 55 has Q factor indicating strength of a prescribed resonance that is decided by the antenna constant. This Q factor is proportional to La/Ra of the antenna constant, and when the value of La is made constant, it has the characteristic of $Q \propto 1/Ra$. Generally, it is performed to reduce a winding number of a coil and to form the transmission antenna in order to cheapen transmission antenna 55. The Q factor of the conventional art transmission antenna 55 is relatively small, for instance, Q=10.

Antenna device 50 is configured such that transmission antenna 55 is connected to transmitting unit 51 as described above.

According to the above-mentioned configuration, modulation unit 52 controls ON/OFF state of driving circuit 57 by modulated signal Sf in antenna device 50. As a result, antenna current Ie shown in FIG. 9 flows to transmission antenna 55. Transmission antenna 55 transmits intensity of the transmission request signal according to antenna current Ie and forms the communication range that is substantially in proportion to the size of antenna current Ie.

That is, in t1 (t-ON) period (during energizing) where binary signal Sa is H and modulated signal Sf repeats H/L, modulation unit 52 alternately controls ON/OFF state of first power transistor 121 and second power transistor 122. For this reason, transmission antenna 55 becomes in the energizing state. At this time, as shown in the waveform of positive polarity envelope of FIG. 9, since Q factor of transmission antenna 55 is Q=10 which is relatively small, antenna current Ie becomes energizing current 91 that is saturated to the maximum current soon after rising.

In t2 (t-OFF) period (during non-energizing the current) where binary signal Sa is L and modulated signal Sf is also L, modulation unit 52 controls only power transistor 122 at ON state. For this reason, transmission antenna 55 becomes in the non-energizing state. At this time, antenna current Ie is consumed by resistance 53 and becomes non-energizing current 92 that converges to zero soon after falling.

As described above, since Q factor of transmission antenna 55 is small in any case of the energizing current 91 and the non-energizing current 92, antenna current Ie of transmission antenna 55 has the characteristic that is immediately saturated or converged. In antenna device 50, energizing current 91 is changed by varying resistance Ra of the antenna constant, and the communication range that is substantially in proportion to the maximum value is formed.

That is, in antenna device 50, since the maximum value of the energizing current 91 flowing into transmission antenna 55 is changed by resistance Ra of the antenna constant, as shown in FIG. 9, large energizing current J1 flows into transmission antenna 55, when R is small. Moreover, small energizing current J2 flows into transmission antenna 55, when R is large. For this reason, for example, the desired communication range is formed at the inside or outside of the vehicle in proportion to the size of the energizing current 91 that flows into each transmission antenna 55 through transmission antenna 55 arranged in the door handle or the vicinity of the instrument panel.

For example, Japanese Patent Unexamined Publication No. 2002-47835 is known as information of a conventional art document that relates to the above-mentioned technology.

According to the conventional art antenna device as described above, the formation of the communication range is performed with varying resistance value Ra in the resistance of the antenna device. Accordingly, the individual communication range, which differs depending on the arrangement position of the transmission antenna, vehicle model or the like, is set by varying resistance Ra of each antenna device.

It is complicate to set the communication range by varying this resistance value Ra. That is, every time the communication range is measured by using an experiment vehicle or the like, operation that attaches again resistance with soldering iron is accompanied. Furthermore, the communication range is changed when the arrangement position of the transmission antenna or the vehicle design etc. are varied between from the experiment vehicle to a finished vehicle. Therefore, similar operation is performed in each case of those changes.

An universal article is generally used as the resistance. The resistance value is decided within the range of, for example, 5Ω to 12Ω, and the range is changed gradually into 4.9 Ω, 5.6 Ω, 6.8Ω, . . . , according to JIS standard or the like. Therefore, the formation of the communication range is difficult when such a resistance as 5.3Ω that is not included in the JIS standard is necessary. Accordingly, the formation of the communication range with a good accuracy is difficult.

SUMMARY OF THE INVENTION

An antenna device according to the present invention has a structure as follows.

An antenna device includes: a transmitting unit which is connected to a control unit of an in-vehicle device mounted at a vehicle; and a transmission antenna connected to the transmitting unit. The transmitting unit operates the transmission antenna based on a binary signal and a carrier signal from the control unit. The transmitting unit includes: a duty ratio controller that modifies the binary signal to a duty ratio signal having a prescribed duty ratio and outputs the duty ratio signal; and a driving circuit that supplies an energizing current to the transmission antenna based on the carrier signal. The duty ratio controller changes intensity of the signal transmitted from the transmission antenna by changing the energizing current according to the duty ratio signal so as to form a desired communication range.

According to the antenna device of the present invention having the above-mentioned configuration, a communication range of the antenna device is set without changing the resistance of the antenna constant, and a desired communication range is set with a good accuracy.

DETAILED DESCRIPTION OF PREFERRED EMBODIMENTS

Preferred embodiments of the present invention will be now described with reference to FIG. 1 and FIG. 2.

First Embodiment

Figure 1:
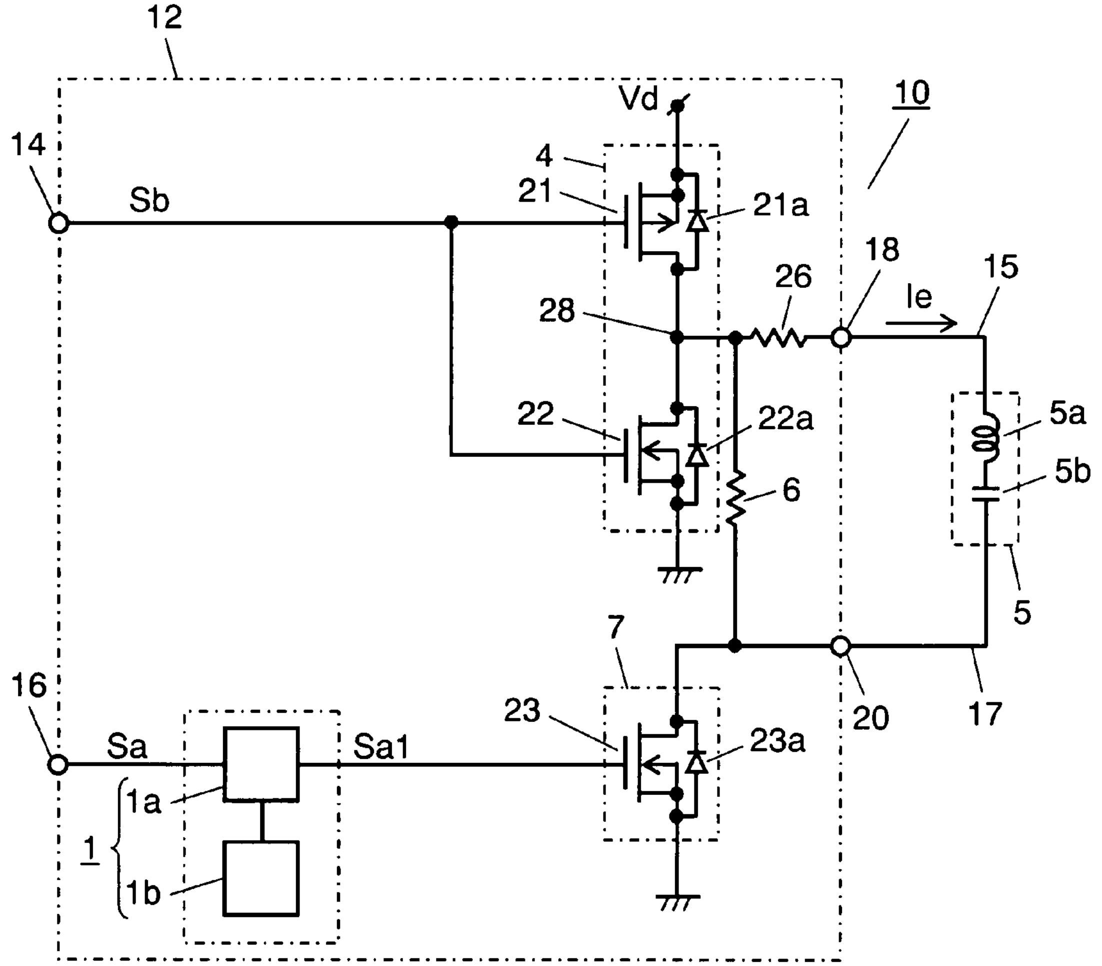
FIG. 1 is a block diagram of an antenna device according to a first embodiment of the present invention.

FIG. 1 is a block diagram of antenna device according a first embodiment of the present invention. FIG. 2 is waveform diagrams demonstrating an operation of antenna device according to the first embodiment of the present invention.

Referring to FIG. 1, antenna device 10 includes transmitting unit 12 and transmission antenna 5 connected to transmitting unit 12. Transmitting unit 12 includes duty ratio controller 1, driving circuit 4, switching circuit 7, resistance 26, and resistance 6.

Duty ratio controller 1 includes duty ratio control unit 1a and storage unit 1b. Storage unit 1b stores duty ratio information on a plurality of duty ratios in advance. Duty ratio control unit 1a controls such that binary signal Sa of the duty ratio 50% shown in FIG. 2 becomes desired duty ratio signal Sa1 shown in FIG. 2, according to the duty ratio information selected from storage unit 1b. Binary signal Sa is input from a control unit (not shown) of the in-vehicle device to duty ratio control unit 1a through inputting terminal 16 of transmitting unit 12.

Binary signal Sa is a signal of a cycle T having a duty ratio of 50% to which each period t0 of High (H)/Low (L) is equal. Meanwhile, duty ratio signal Sa1 is formed base on duty ratio information, and is a signal of a cycle T having a prescribed duty ratio that is decided by the ratio of a period t1 of H and a period t2 of L.

Driving circuit 4 is formed with first power transistor 21 and second power transistor 22 serving as a pair of switching element that is connected in series between power supply Vd and earth (GND). Here, first power transistor 21 on power supply Vd side is P channel FET, and second power transistor 22 on the GND side is N channel FET. Moreover, first power transistor 21 and second power transistor 22 are provided with parasitic diodes 21a and 22a in parallel, respectively.

Figure 2:
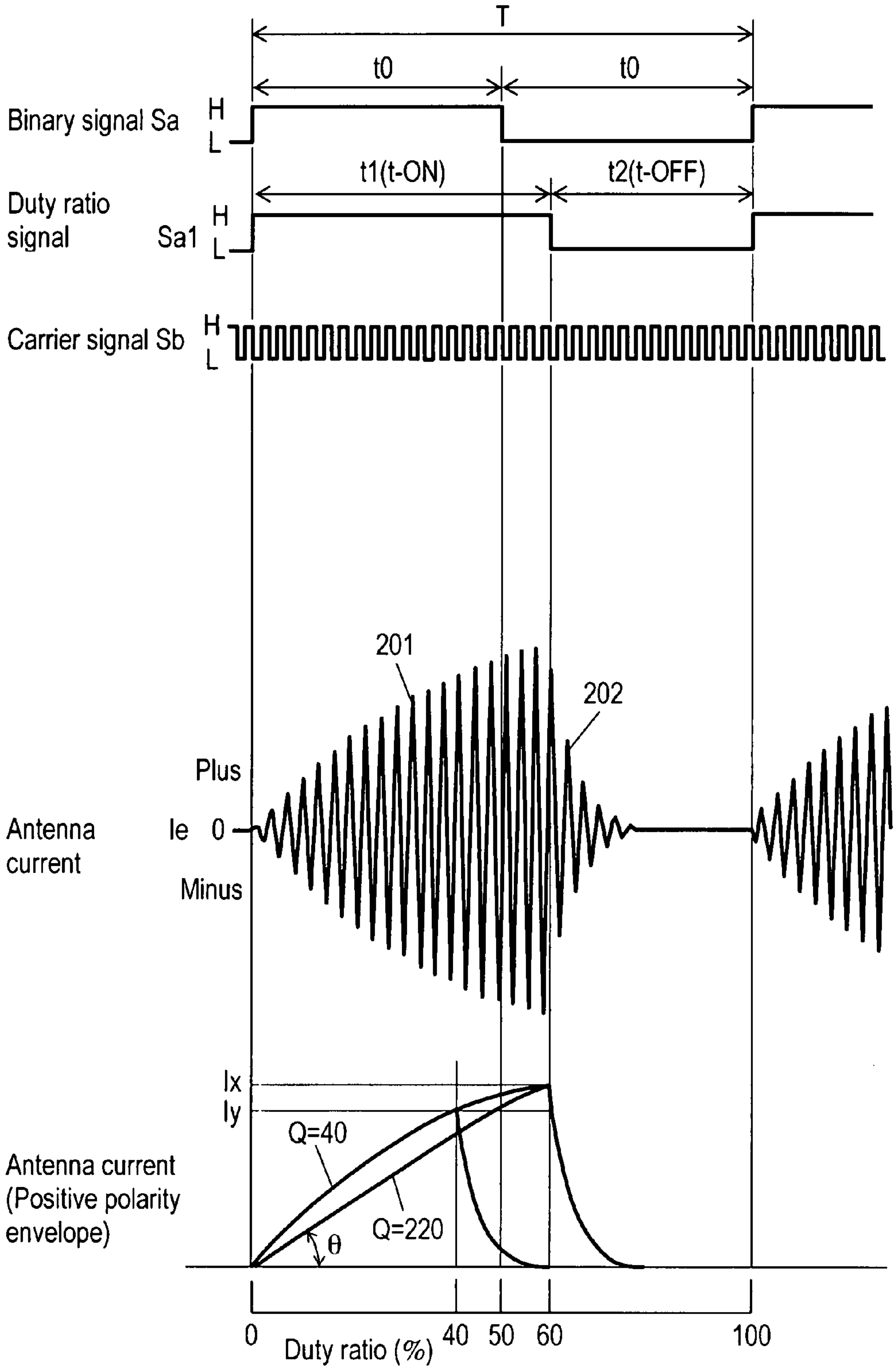
FIG. 2 is waveform diagrams demonstrating an operation of the antenna device according to the first embodiment of the present invention.

In driving circuit 4, carrier signal Sb that forms a pulse string shown in FIG. 2 is input to first power transistor 21 and second power transistor 22, respectively from a control unit (not shown) of the in-vehicle device through input terminal 14 of transmitting unit 12. First power transistor 21 and second power transistor 22 are ON/OFF controlled by carrier signal Sb.

Switching circuit 7 is formed with third power transistor 23. Third power transistor 23 is N channel FET and includes parasite diode 23a in parallel. Duty ratio signal Sa1 shown in FIG. 2 is input to third power transistor 23 from duty ratio controller 1, and third power transistor 23 is ON/OFF controlled by duty ratio signal Sa1.

Transmission antenna 5 includes coil 5*a* and capacitor 5*b* that are connected to each other in series. One end of transmission antenna 5 is connected to middle point 28 between first power transistor 21 and second power transistor 22 through wiring 15, terminal 18, and resistance 26 which is disposed at transmitting unit 12. The other end of transmission antenna 5 is connected to third power transistor 23 through wiring 17 and terminal 20, and connected to GND through third power transistor 23. That is, transmission antenna 5 is connected between driving circuit 4 and switching circuit 7.

Resistance 26, coil 5*a*, and capacitor 5*b* have resistance value Ra, inductance La, and capacitor Ca, respectively. Ra, La, and Ca are referred to as antenna constants. Transmission antenna 5 has Q factor indicating strength of a prescribed resonance that is decided by the antenna constant. In order to obtain a prescribed Q factor, transmission antenna 5 has coil 5*a* with a lot of winding numbers based on the relational expression of $Q \propto La/Ra$. For this reason, this Q factor has relatively large value within the range of Q=40 to 220.

Resistance 6 forms an attenuation circuit. Resistance 6 is connected between third power transistor 23 and middle point 28 of first power transistor 21 and second power transistor 22. Accordingly, resistance 6 is connected to a series connection body of resistance 26 and transmission antenna 5 in parallel. Furthermore, resistance 6 may be connected to transmission antenna 5 in parallel.

According to the above-mentioned configuration, in antenna device 10, duty ratio controller 1 controls ON/OFF state of switching circuit 7 by using duty ratio signal Sa1. At the same time, the control unit (not shown) of the in-vehicle device controls ON/OFF state of driving circuit 4 by using carrier signal Sb. As a result, antenna current Ie shown in FIG. 2 flows to transmission antenna 5 having a prescribed Q factor. Antenna device 10 transmits intensify of the transmission request signal according to antenna current Ie and forms the communication range that is substantially in proportion to the size of antenna current Ie. Antenna current Ie, which is controlled by switching circuit 7 and flows to transmission antenna 5, changes depending on an energizing time to transmission antenna 5.

The waveform of positive polarity envelope of antenna current Ie is shown in FIG. 2.

That is, in t-ON period (during energizing) where duty ratio signal Sa1 is H and carrier signal Sb repeats H/L, duty ratio controller 1 controls third power transistor 23 to ON state. At this time, since first power transistor 21 and second power transistor 22 are alternately ON/OFF controlled by carrier signal Sb, transmission antenna 5 becomes in the energizing state. Q factor of transmission antenna 5 has a relatively large value within the range of Q=40 to 220. Therefore, as shown in FIG. 2, antenna current Ie flows to transmission antenna 5 without saturating at once after rising, where antenna current Ie serves as energizing current 201 of the energizing state having a waveform of a positive polarity envelope that represents a substantial straight shape from a substantial parabola.

In t2 (t-OFF) period (during non-energizing the current) where duty ratio signal Sa1 is L, duty ratio controller 1 controls third power transistor 23 to OFF state. For this reason, transmission antenna 5 becomes in the non-energizing state regardless of alternately ON/OFF controlling of first power transistor 21 and second power transistor 22 as carrier signal Sb repeats H/L. Therefore, antenna current Ie becomes non-energizing current 202 of non-energizing state that converges to zero soon after falling.

A loop-shaped passage of this non-energizing current 202 is formed with transmission antenna 5 and resistance 6 serving as an attenuation circuit connected to transmission antenna 5 in parallel, and non-energizing current 202 is consumed and attenuated with this resistance 6 which has resistance value much larger than resistance 26, thereby being rapidly converged to zero.

As described above, since Q factor of transmission antenna 5 is relatively large, antenna current Ie of transmission antenna 5 has the characteristic that represents a substantial straight shape from a substantial parabola without saturating immediately after rising of energizing current 201.

Antenna device 10 uses the rising characteristic of energizing current 201 at t-ON period (during energizing) where duty ratio signal Sa1 is H, and antenna device 10 changes the maximum value of energizing current 501 by varying the duty ratio of duty ratio signal Sa1. Antenna device 10 transmits intensity of the signal based on energizing current 201 in which the maximum value is changed, as a transmission request signal. For this reason, for example, the desired communication range is formed at the inside or outside of the vehicle in proportion to the size of energizing current 201 that flows into transmission antenna 5 arranged in the door handle or the vicinity of the instrument panel.

Specifically, the communication range of antenna device 10 is formed as follows.

For example, when Q factor of transmission antenna 5 is 40 and duty ratio controller 1 selects duty ratio information "60" on storage unit 1*b*, the positive polarity envelope in the energizing current 201 of antenna current Ie shows the characteristic in which the rising represents a substantial parabola without saturating, as shown in FIG. 2.

It considers the case where the communication range is formed with selecting duty ratio information "60" on storage unit 1*b* due to duty ratio controller 1, when Q factor is larger, for example, Q factor is about 220. In this case, the positive polarity envelope in the energizing current 201 of antenna current Ie shows the characteristic in which the rising is substantially in inverse proportion to Q factor to become small inclination θ, and represents a substantial straight shape, as shown in FIG. 2.

Accordingly, as shown in FIG. 2, when Q factor of transmission antenna 5 is 40 and the duty ratio of duty ratio signal Sa1 is 60%, antenna device 10 can set the maximum value of energizing current 201 to current Ix. In addition, when Q factor of transmission antenna 5 is 40 and the duty ratio of duty ratio signal Sa1 is 40%, antenna device 10 can set the maximum value of energizing current 201 to current Iy.

Meanwhile, when Q factor of transmission antenna 5 is 220 and the duty ratio of duty ratio signal Sa1 is 60%, antenna device 10 can set the maximum value of energizing current 201 to current Ix. In addition, when Q factor of transmission antenna 5 is 220 and the duty ratio of duty ratio signal Sa1 is 50%, antenna device 10 can set the maximum value of energizing current 201, where Ix>Iy.

As described above, duty ratio controller 1 changes the maximum value of energizing current 201 of transmission antenna 5 by varying the duty ratio of duty ratio signal Sa1. For this reason, transmitting unit 12 transmits intensity of the transmission request signal based on energizing current 201 from transmission antenna 5 and forms the desired communication range that is substantially in proportion to this current.

Antenna device 10 can store duty ratio information in storage unit 1*b* as a value distinguished in detail, for example, 53% and 53.5%. Therefore, since in antenna device 10, duty ratio controller 1 selects the detailed duty ratio information of storage unit 1*b* by program manipulation of duty ratio control unit 1*a* and thereby the maximum value of the energizing current 201 of transmission antenna 5 is minutely changed, it is possible to set the communication range having a good accuracy.

It is preferable that the practicable duty ratio of this duty ratio signal Sa1 is set in the range of 40% to 60% so as to ensure transmission time of the transmission request signal.

Figure 9:
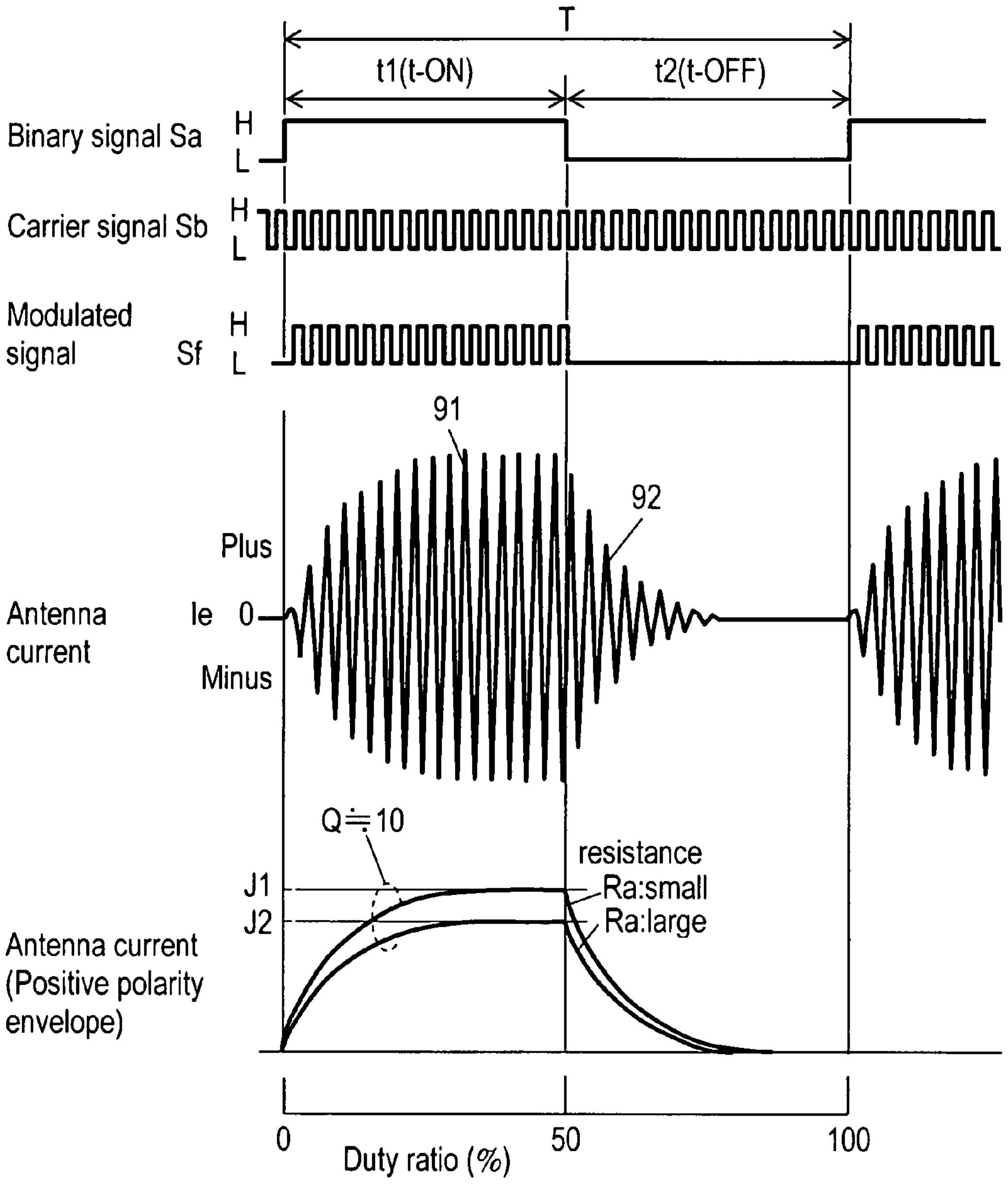
FIG. 9 PRIOR ART
FIG. 9 is a waveform diagram demonstrating an operation of the conventional antenna device.

Moreover, it is preferable that Q factor of transmission antenna 5 is in the range of 40 to 220. When Q factor is less than 40, the rising characteristic of energizing current 201 becomes closer to that of energizing current 91 of the conventional art shown in FIG. 9. When Q factor becomes much smaller than 40, the rising of energizing current 201 is immediately saturated. Therefore, even though the duty ratio is changed somewhat, since the change in the antenna current is small, it is difficult to use in practice.

Meanwhile, when Q factor is more than 220, since the rising characteristic of energizing current 201 shows that the inclination θ becomes further small to have a gently inclined straight, there is a practicality. However, the winding number of the coil is need to further increase from the relational expression of $Q \propto La/Ra$ to further enlarge Q factor. Moreover, since it becomes easy to be influenced by the wiring resistance of wirings 15 and 17 to reduce resistance Ra having the value of several ohms, there is a limit to reduce resistance Ra. Accordingly, it is difficult to use in practice.

As described above, according to an embodiment of the present invention, the maximum value of energizing current 201 that flows into transmission antenna 5 can be adjusted by varying the duty ratio of duty ratio signal Sa1 formed with duty ratio controller 1, so that the desired communication range can be formed with using transmission antenna 5 having a prescribed Q factor. In duty ratio controller 1, duty ratio signal Sa1 is set by selecting from the value distinguished in detail. For this reason, it is possible to obtain antenna device 10 in which the communication range having a good accuracy is set.

In addition, the range where the rising characteristic is useful, that is, the maximum value of energizing current 201 can be effectively changed with the duty ratio of duty ratio signal Sa1 by adjusting Q factor of transmission antenna 5 to the range of about 40 to 220.

Furthermore, non-energizing current 202 can be adjusted to zero in a short time by providing the attenuation circuit that attenuates non-energizing current 202 of transmission antenna 5. As a result, it is possible to maintain communication performance without changing transmission speed of the transmission request signal. The attenuation circuit can be configured at a low price by forming with resistance 6.

Second Embodiment

In a second embodiment of the present invention, the same reference numerals can be denoted to the same component as in the first embodiment of the present invention and the detailed description will be simplified.

Figure 3:
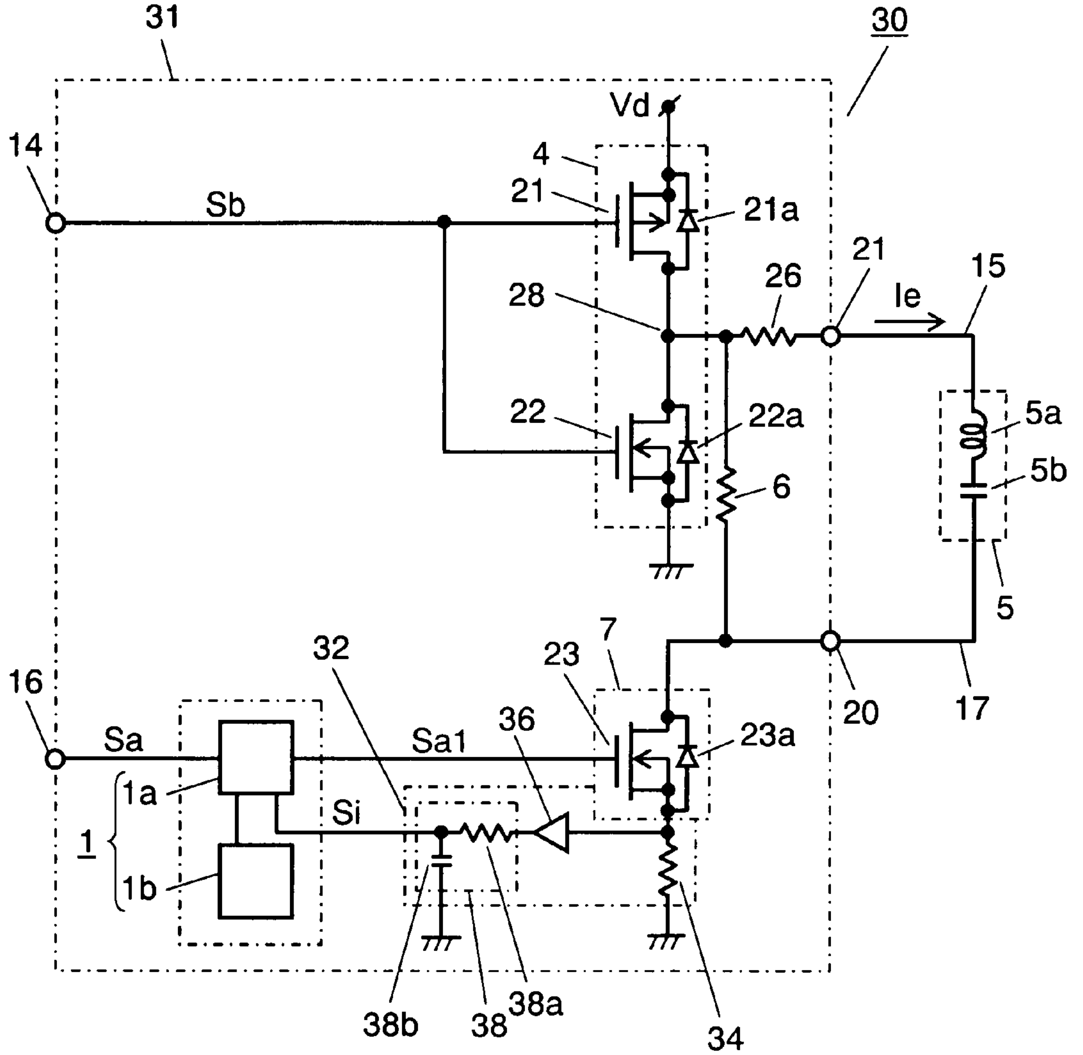
FIG. 3 is a block diagram of an antenna device according to a second embodiment of the present invention.

FIG. 3 is a block diagram of an antenna device according to the second embodiment of the present invention. Transmitting unit 31 further includes current detecting circuit 32 that detects antenna current Ie in addition to elements of transmitting unit 12 of the first embodiment of the present invention.

Current detecting circuit 32 includes resistance 34, amplifier 36, and low-pass filter 38. Resistance 34 is inserted between third power transistor 23 and GND. Amplifier 36 amplifies the voltage generated in resistance 34 by the flowing of antenna current Ie. Low-pass filter 38 is configured with resistance 38*a* and capacitor 38*b*. Low-pass filter 38 smoothes the output signal of amplifier 36. Moreover, antenna device 30 feedbacks analog detecting signal Si that varies depending on antenna current Ie to duty ratio controller 1.

According to the above-mentioned configuration, in duty ratio controller 1, duty ratio control unit 1*a* recognizes as a digital signal by converting detecting signal Si proportional to antenna current Ie into AD. At the same time, duty ratio controller 1 controls the duty ratio of duty ratio signal Sa1 by comparing this digital signal with current reference value Is stored in storage unit 1*b* beforehand, such that antenna current Ie and current reference value Is may be equal to each other, that is, Si=Is.

Therefore, antenna device 30 forms the desired communication range by properly selecting current reference value Is, and performs a feedback control so that antenna current Ie and current reference value Is may be always equal to each other.

One example of the above-mentioned feedback control is as follows.

Duty ratio controller 1 changes the duty ratio of duty ratio signal Sa1 at regular intervals, and operates transmission antenna 5 in a prescribed number. Duty ratio controller 1 selects and decides the duty ratio having a minimum difference with current reference value Is among two or more detecting signals Si obtained by above-mentioned operation. Since antenna current Ie flowing into transmission antenna 5 is controlled by duty ratio signal Sa1 of the decided duty ratio, constant antenna current Ie can be secured, and the communication range can be constantly maintained.

According to this embodiment of the present invention, current detecting circuit 32 is provided, and duty ratio controller 1 feedbacks detecting signal Si so that antenna current Ie and current reference value Is are equal to each other and controls transmission antenna 5. For this reason, it is possible to obtain stable antenna device 30 in which the deviation of the circuit characteristic or the communication range that varies in response to influence on, for example, parameter deviation, secular variation, and temperature change of transmission antenna 5 is small in addition to the effect according to the first embodiment of the present invention.

According to this embodiment of the present invention, it is demonstrated that storage unit 1*b* stores current reference value Is. However, the present invention is not limited to this, and conversion data information of detection signal Si previously stored and the duty ratio may be used in place of current reference value Is.

Third Embodiment

Figure 4:
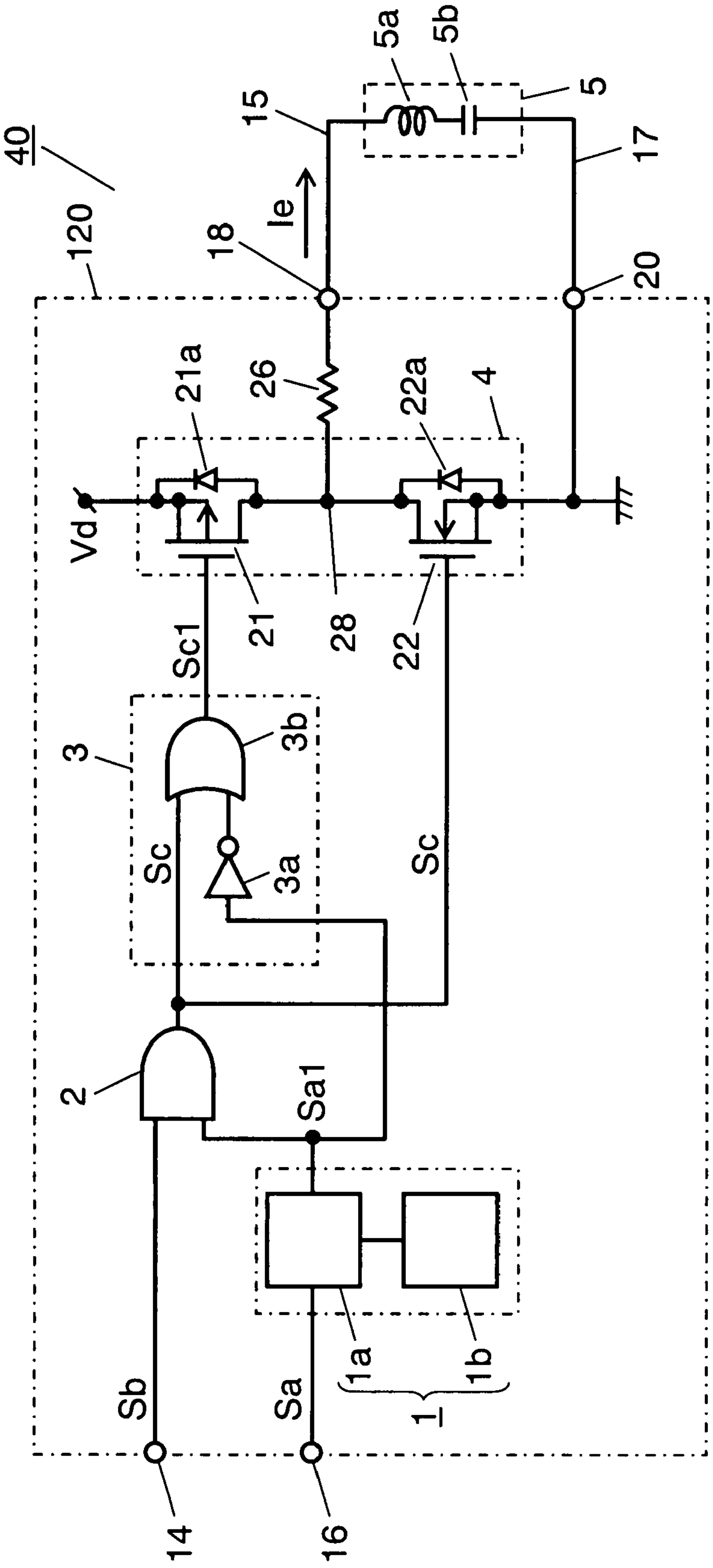
FIG. 4 is a block diagram of an antenna device according to a third embodiment of the present invention.
Figure 5:
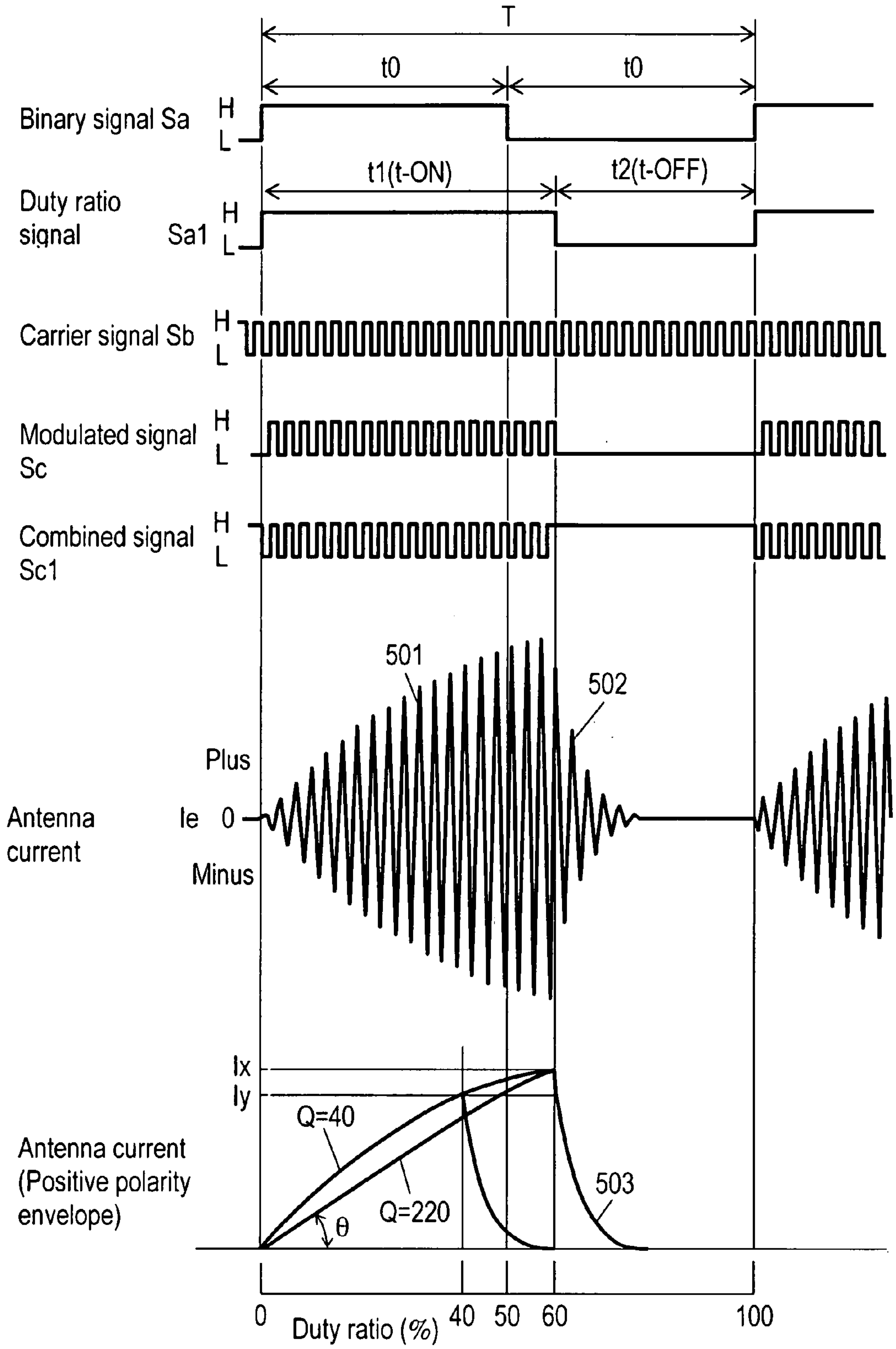
FIG. 5 is waveform diagrams demonstrating an operation of the antenna device according to the third embodiment of the present invention.

FIG. 4 is a block diagram of an antenna device according to a third embodiment of the present invention. FIG. 5 is waveform diagrams demonstrating an operation of this antenna device.

Figure 6:
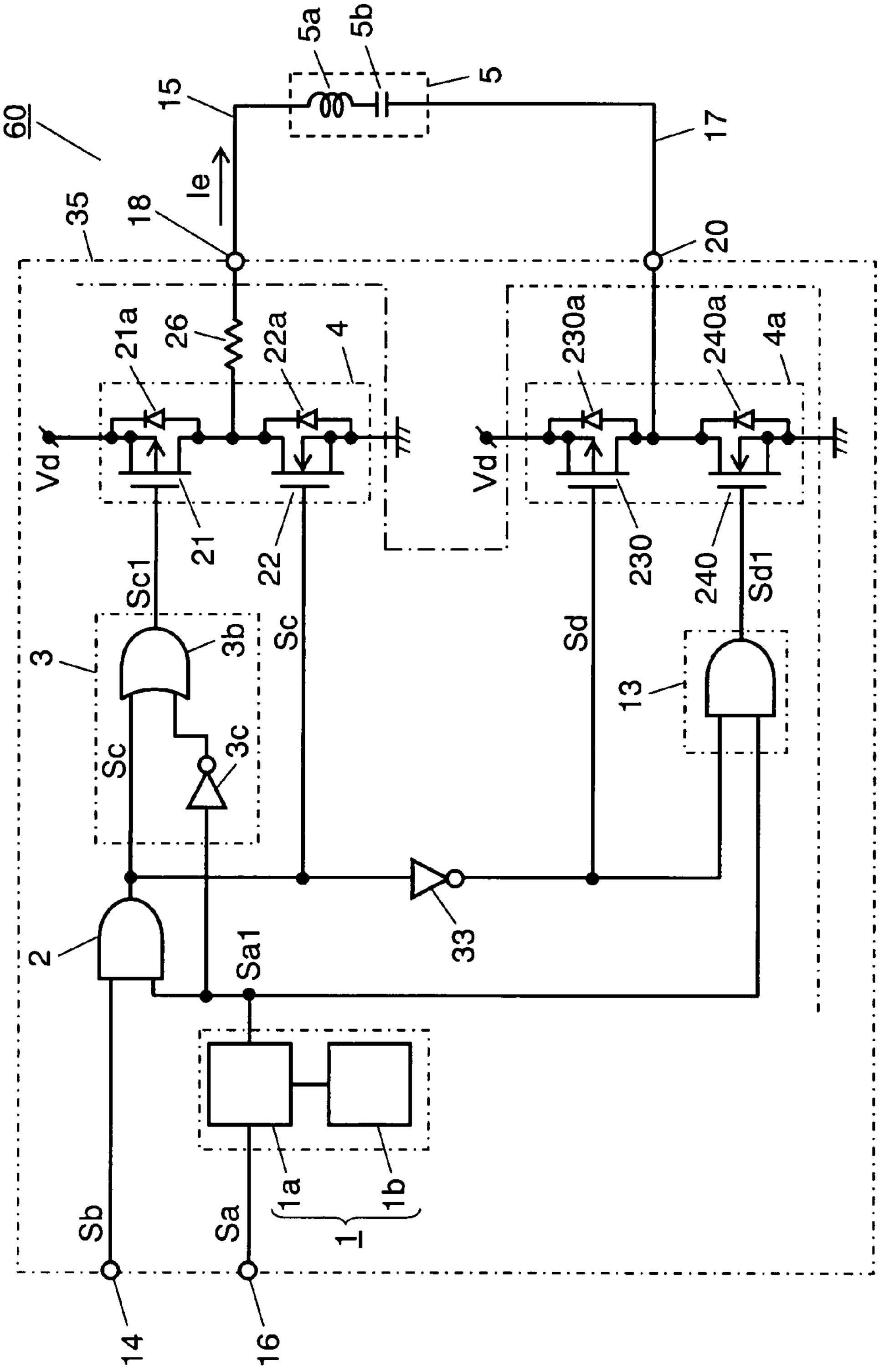
FIG. 6 is a block diagram of another antenna device according to the third embodiment of the present invention.

FIG. 6 is a block diagram of another antenna device according to the third embodiment of the present invention.

In the third embodiment of the present invention, the same reference numerals can be denoted to the same component as in the first and second embodiments of the present invention, and the detailed description will be simplified.

Transmitting unit 120 includes duty ratio controller 1.

Duty ratio controller 1 has the same components as the duty ratio controller demonstrated in the first and second embodiments of the present invention. In a word, as described in the first embodiment of the present invention, duty ratio controller 1 controls such that binary signal Sa of the duty ratio 50% shown in FIG. 5 becomes desired duty ratio signal Sa1 shown in FIG. 5. Binary signal Sa is the same signal as binary signal Sa described in the first embodiment. In short, binary signal Sa is input from a control unit (not shown) of the in-vehicle device to duty ratio control unit 1*a* through inputting terminal 16 of transmitting unit 120.

Transmitting unit 120 includes modulation unit 2, signal combining unit 3, driving circuit 4 and resistance 26.

Modulation unit 2 is formed with AND circuit. Duty ratio signal Sa1 is input to one input terminal of modulation unit 2, and carrier signal Sb shown in FIG. 5 is input to the other input terminal of modulation unit 2 from the control unit (not shown) of the in-vehicle device. Modulated signal Sc shown in FIG. 5 is output from the above-mentioned two signals.

Here, carrier signal Sb is a signal that forms the pulse string of carrier frequency f0. Furthermore, modulated signal Sc has the same duty ratio as duty ratio signal Sa1.

Signal combining unit 3 includes logic circuit of inverter 3*a* and OR circuit 3*b*. Signal combining unit 3 outputs combined signal Sc1 shown in FIG. 5 combining modulated signal Sc to be input with duty ratio signal Sa1. This combined signal Sc1 also has the same duty ratio as duty ratio signal Sa1.

Driving circuit 4 has the same configuration as the driving circuit of the first and second embodiments of the present invention. Generally, this circuit is referred to as a half bridge.

In driving circuit 4, combined signal Sc1 is input to first power transistor 21, and modulated signal Sc is input to second power transistor 22, respectively. First power transistor 21 and second power transistor 22 are ON/OFF controlled by combined signal Sc1 and modulated signal Sc.

Transmission antenna 5 has the same configuration as the transmission antenna of the first and second embodiments of the present invention. One end of transmission antenna 5 is connected to middle point 28 between first power transistor 21 and second power transistor 22 through wiring 15, terminal 18, and resistance 26 which is disposed at transmitting unit 120.

The other end of transmission antenna 5 is connected to GND of transmitting unit 120 through wiring 17 and terminal 20.

Like the first and second embodiments of the present invention, resistance 26, coil 5*a*, and capacitor 5*b* have resistance value Ra, inductance La, and capacitor Ca, respectively.

Here, transmission antenna 5 has Q factor that is relatively large value within the range of Q=40 to 220, as described in the first and second embodiments of the present invention.

According to the above-mentioned configuration, antenna device 40 uses transmission antenna 5 having a prescribed Q factor and uses the rising characteristic of the energizing current of transmission antenna 5 decided by Q factor.

That is, duty ratio controller 1 changes the maximum value of energizing current of transmission antenna 5 by varying duty ratio signal Sa1. For this reason, the signal according to this current is output from transmission antenna 5, as a transmission request signal. Accordingly, transmission antenna 5 forms the communication range that is substantially in proportion to the size of this current.

For example, it will be described the example in which duty ratio controller 1 selects duty ratio information “60” of storage unit 1*b*, outputs duty ratio signal Sa1 of the duty ratio 60% from binary signal Sa of the duty ratio 50%, and forms the communication range.

First, duty ratio controller 1 selects the duty ratio information “60”. For this reason, combined signal Sc1 input to first power transistor 21 and modulated signal Sc input to second power transistor 22 have t1 (t-ON) period and t2 (t-OFF) period by cycle T, and is formed to the signal of the duty ratio 60% whose t1/T is 0.6.

First power transistor 21 is ON/OFF controlled by combined signal Sc1 of FIG. 5, and second power transistor 22 is ON/OFF controlled by modulated signal Sc of FIG. 5. Therefore, antenna current Ie shown in FIG. 5 flows to transmission antenna 5.

Moreover, when combined signal Sc1 and modulated signal Sc are L, first power transistor 21 is ON controlled, and second power transistor 22 is OFF controlled. Meanwhile, when combined signal Sc1 and modulated signal Sc are H, first power transistor 21 is OFF controlled, and second power transistor 22 is ON controlled.

Accordingly, in t-ON period where combined signal Sc1 and modulated signal Sc repeat H/L, first power transistor 21 and second power transistor 22 are alternately ON/OFF controlled. For this reason, energizing current 501 in the energizing state flows to transmission antenna 5.

In t2 (t-OFF) period where combined signal Sc1 is H and modulated signal Sc is L, first power transistor 21 and second power transistor 22 are OFF controlled. For this reason, non-energizing current 502 in the non-energizing state flows to transmission antenna 5.

Antenna current Ie is formed by an alternately continued current in energizing current 501 and non-energizing current 502.

For example, when Q factor of transmission antenna 5 becomes approximately 40, as shown in FIG. 5, the positive polarity envelope in the energizing current 501 of antenna current Ie shows the characteristic in which the rising represents a substantial parabola without saturating, like the first embodiment of the present invention.

When Q factor of transmission antenna 5 is larger (e.g., Q factor is about 220), since antenna current Ie is substantially in inverse proportion to Q factor to become small inclination θ of the rising, the rising characteristic of energizing current 501 represents a substantial straight.

Accordingly, in t-ON (t1) period where Q factor of transmission antenna 5 is 40 and the duty ratio of duty ratio signal Sa1 is 60%, the maximum value of energizing current 501 flowing to transmission antenna 5 can be set to current Ix. In addition, when Q factor of transmission antenna 5 is 40 and the duty ratio of duty ratio signal Sa1 is 40%, the maximum value of energizing current 501 can be set to current Iy, where Ix>Iy.

Furthermore, in t-ON period where Q factor of transmission antenna 5 is 220 and the duty ratio of duty ratio signal Sa1 is 60%, the maximum value of energizing current 501 flowing to transmission antenna 5 can be set to current Ix. In addition, when Q factor of transmission antenna 5 is 220 and the duty ratio of duty ratio signal Sa1 is 50%, the maximum value of energizing current 501 can be set to current Iy.

That is, energizing current 501 can be set to current Ix in the duty ratio 60% when Q factor is 40, and energizing current 501 can be set to current Iy in the duty ratio 40% when Q factor is 40. Moreover, energizing current 501 can be set to current Ix in the duty ratio 60% when Q factor is 220, and energizing current 501 can be set to current Iy in the duty ratio 50% when Q factor is 220.

As described above, duty ratio controller 1 changes the maximum value of energizing current 501 of transmission antenna 5 by varying the duty ratio of duty ratio signal Sa1. For this reason, it forms the desired communication range that is substantially in proportion to this current.

Therefore, as described in the first embodiment of the present invention, since detailed duty ratio information such as duty ratio 53% is stored in storage unit 1*b* to be selected, it is possible to accurately adjust the formation of the communication range.

It is preferable that the practicable duty ratio of this duty ratio signal Sa1 is set in the range of 40% to 60% so as to ensure transmission time of the transmission request signal.

Moreover, as described reason in the first embodiment of the present invention, it is preferable that Q factor of transmission antenna 5 is in the range of 40 to 220.

It is preferable to shorten the falling time of non-energizing current 502 in t-OFF period so as to adjust the non-energizing current to zero in prescribed cycle T.

In the above t-OFF period, combined signal Sc1 input to first power transistor 21 is set to H by the operation of signal combining unit 3, and modulated signal Sc input to second power transistor 22 is set to L by the operation of signal combining unit 3. As a result, both first power transistor 21 and second power transistor 22 are OFF controlled.

For the passage of non-energizing current 502 in t-OFF period, when non-energizing current 502 flows in a positive direction, that is, in an arrow direction Ie shown in FIG. 4, non-energizing current 502 flows through a path that again returns to transmission antenna 5 via GND and parasitic diode 22*a* of second power transistor 22 from transmission antenna 5. Meanwhile, when non-energizing current 502 flows in a negative direction, non-energizing current 502 flows through a path that connects power supply Vd via transmission antenna 5 and parasitic diode 21*a* of first power transistor 21 from GND.

For the passage and the path of non-energizing current 502, when non-energizing current 502 flows in the positive direction or in the negative direction, for convenience, it is defined that the attenuation circuit is connected with transmission antenna 5 in parallel.

Non-energizing current 502 in t-OFF period passes through parasitic diodes 21*a* and 22*a* of the attenuation circuit by the operation of signal combining unit 3 in the passage of both the positive direction and the negative direction. Accordingly, non-energizing current is consumed in parasitic diodes 21*a* and 22*a*, and non-energizing current 502 of FIG. 5 rapidly attenuates and converges to zero, as shown in positive polarity envelope 503 of FIG. 5.

Therefore, non-energizing current 502 is adjusted to zero in prescribed cycle T. That is, the transmission speed of the transmission request signal does not decrease, since it is not necessary to lengthen cycle T.

As described above, according to this embodiment of the present invention, since antenna device 40 adjusts the maximum value of energizing current 501 that flows into transmission antenna 5 having a prescribed Q factor by varying the duty ratio of duty ratio signal Sa1 formed with duty ratio controller 1, the desired communication range can be formed.

Therefore, it is possible to obtain the antenna device that can form the communication range having a good accuracy by setting the duty ratio of duty ratio signal Sa1 in detail.

The range where the rising characteristic is useful, that is, the maximum value of energizing current 501 can be changed at the duty ratio of duty ratio signal Sa1 by adjusting Q factor of transmission antenna 5 to the range of about 40 to 220.

Furthermore, even when Q factor of transmission antenna 5 is largely set, non-energizing current 502 can be adjusted to zero in a short time by providing the attenuation circuit that attenuates non-energizing current 502 of transmission antenna 5. As a result, it is possible to maintain communication performance without changing the transmission speed of the transmission request signal.

The path of the attenuation circuit is formed, where parasitic diodes 21*a* and 22*a* are included. That is, since other added parts are not needed, it is possible to form at a low price. This parasitic diode is inevitably formed in FET structure and is not parts other than FET.

According to this embodiment of the present invention, it is demonstrated that the passage of non-energizing current 502 of transmission antenna 5 passes through parasitic diodes 21*a* and 22*a*. However, it is not limited thereto, and for example, the passage may be formed such that the non-energizing current of the transmission antenna passes through the resistance by connecting the resistance to transmission antenna 5 of FIG. 4 in parallel.

Driving circuit 4 is made a half bridge, but it is not limited thereto. For example, as shown in FIG. 6, by providing driving circuit 4*a* in driving circuit 4 in parallel, antenna device 60 may be configured such that a full bridge is formed with these four power transistors, and transmission antenna 5 is connected to middle points between one pair of the power transistors, respectively.

As shown in FIG. 6, transmitting unit 35 of antenna device 60 includes another driving circuit 4*a*, another inverter circuit 33, and second signal combining unit 13 which is another signal combining unit in addition to driving part 120 shown in FIG. 4.

Second modulated signal Sd, where modulated signal Sc is inversed to second modulated signal Sd by inverter circuit 33, is input to third power transistor 230 of driving circuit 4*a*. Second combined signal Sd1 formed by combining second modulation signal Sd with duty ratio signal Sa1 and second signal combining unit 13 is input to fourth power transistor 240. Here, third power transistor 230 and fourth power transistor 240 have parasitic diodes 230*a* and 240*a*, respectively.

Therefore, first power transistor 21 is ON/OFF controlled by combined signal Sc1. Second power transistor 22 is ON/OFF controlled by modulated signal Sc. Third power transistor 230 is ON/OFF controlled by second modulated signal Sd. Fourth power transistor 240 is ON/OFF controlled by second combined signal Sd1. For this reason, antenna current Ie flows to transmission antenna 5.

This configuration can be formed so that the characteristic of antenna current Ie is the same as that of the half bridge by forming transmission antenna 5 to a prescribed Q factor. Accordingly, it is possible to control output power of transmission antenna 5 by changing the maximum of energizing current 501 depending on the duty ratio of duty ratio signal Sa1. For this reason, antenna device 60 can form the desired communication range.

The above-mentioned full bridge can be used for high electric power compared with the half bridge. In other words, when the full bridge is connected to the same power supply Vd as the half bridge, since energizing current 501 of transmission antenna 5 can be enlarged, a wider communication range can be easily formed.

Fourth Embodiment

Figure 7:
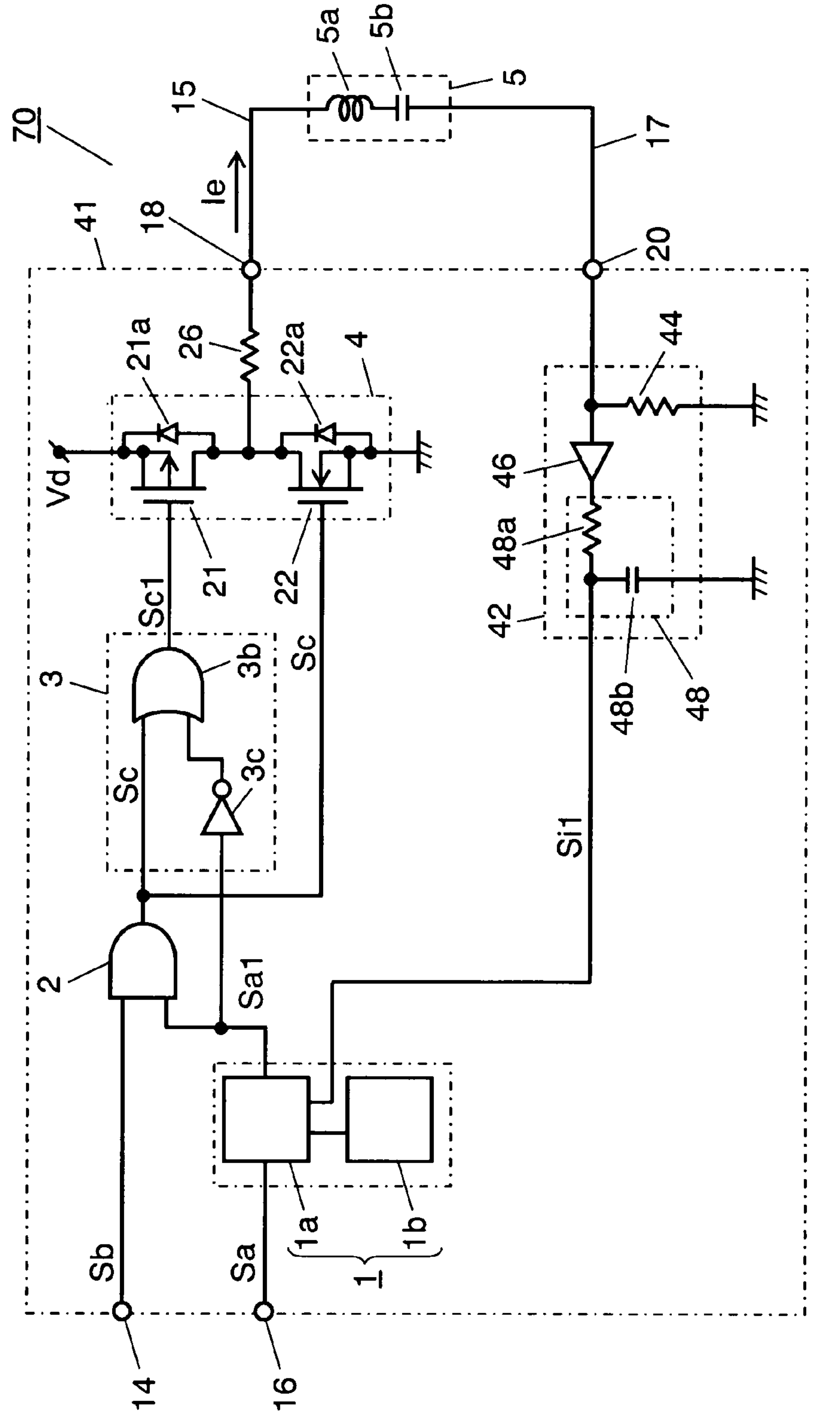
FIG. 7 is a block diagram of an antenna device according to a fourth embodiment of the present invention.
Figure 8:
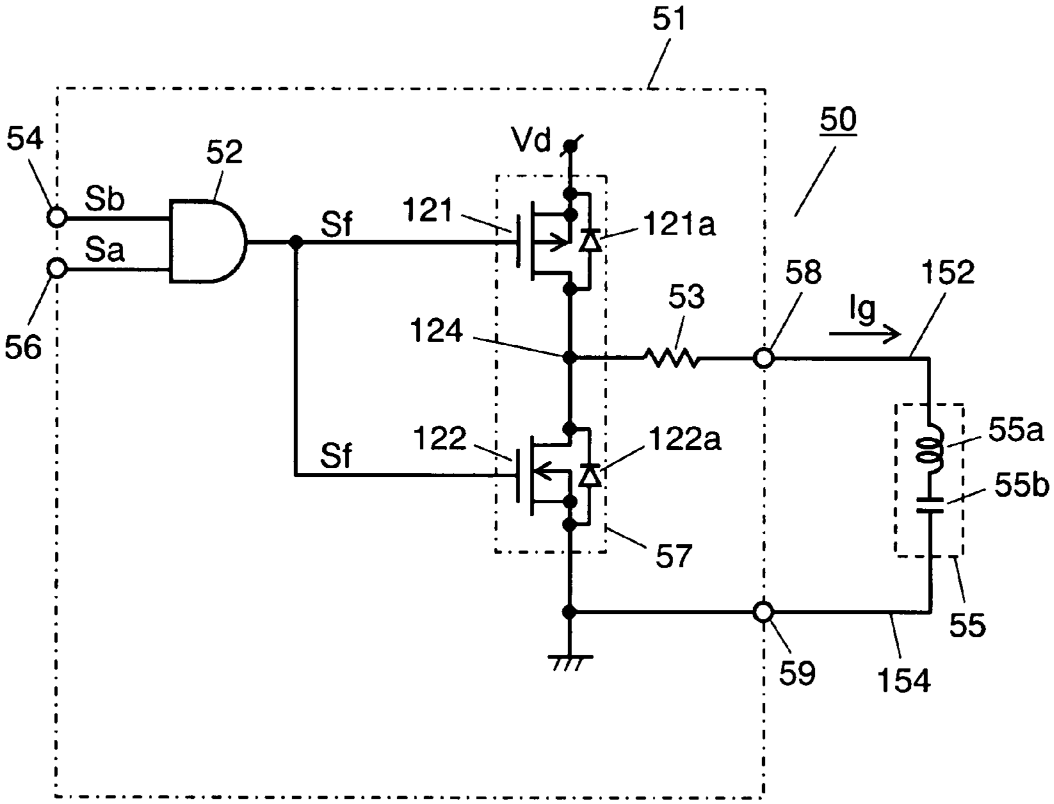
FIG. 8 PRIOR ART
FIG. 8 is a block diagram of a conventional antenna device.

FIG. 7 is a block diagram of an antenna device according to the fourth embodiment of the present invention.

In a fourth embodiment of the present invention, the same reference numerals can be denoted to the same component as in the first to third embodiments of the present invention and the detailed description will be simplified.

Transmitting unit 41 of antenna device 70 according to the fourth embodiment of the present invention further includes current detecting circuit 42 that detects antenna current Ie, in addition to transmitting unit 120 of the third embodiment described above.

Current detecting circuit 42 includes resistance 44 that is inserted between transmission antenna 5 and GND, amplifier 46 that amplifies the voltage generated in resistance 44 when antenna current Ie flows to resistance 44, and low-pass filter 48 that smoothes the output of amplifier 46. Low-pass filter 48 is formed with resistance 48*a* and capacitor 48*b*. Detecting signal Si1 of analog current, which varies depending on antenna current Ie, is fed back to duty ratio controller 1.

According to the above-mentioned configuration, in duty ratio controller 1, duty ratio control unit 1*a* recognizes detecting signal Si1 proportional to antenna current Ie as a digital signal by AD-converting. At the same time, duty ratio controller 1 controls the duty ratio of duty ratio signal Sa1 by comparing this digital signal with current reference value Is1 stored in storage unit 1*b* beforehand, such that antenna current Ie and current reference value Is1 may be equal to each other, that is, Si1=Is1.

Therefore, antenna device 70 forms the desired communication range by properly selecting current reference value Is1 and performs a feedback control so that antenna current Ie and current reference value Is1 are equal to each other.

One example of the above-mentioned feedback control is as follows.

Duty ratio controller 1 changes the duty ratio of duty ratio signal Sa1 at regular intervals, and operates transmission antenna 5 in a prescribed number. Next, duty ratio controller 1 selects and decides the duty ratio having a minimum difference with current reference value Is1 among two or more detecting signals Si1 obtained by this. Since antenna current Ie flowing in transmission antenna 5 is controlled by duty ratio signal Sa1 of selected duty ratio, antenna current Ie can be constantly maintained. Therefore, the constant antenna current Ie can be secured, so that the constant communication range can be maintained.

According to this embodiment of the present invention, current detecting circuit 42 is provided, and duty ratio controller 1 controls transmission antenna 5 by performing feedback detecting signal Si1 so that antenna current Ie and current reference value Is1 are equal to each other. For this reason, it is possible to obtain stable antenna device 40 in which the deviation of the communication range that varies in response to influence on, for example, circuit characteristics or parameter deviation, secular variation, and temperature change of transmission antenna 5 is small in addition to the effect according to the third embodiment of the present invention.

According to this embodiment of the present invention, it is demonstrated that storage unit 1*b* stores current reference value Is1. However, it is not limited thereto, and for example, conversion data information of detection signal Si1 detected previously and the duty ratio may be used in place of current reference value Is1.

The transmitting unit includes a duty ratio controller. The duty ratio controller controls a binary signal such that the binary signal becomes a duty ratio signal having a prescribed duty ratio and outputs the duty ratio signal, the binary signal being input from the control unit of the in-vehicle device to the transmitting unit. An energizing current is supplied to the transmission antenna based on the duty ratio signal and a carrier signal that is input from the control unit of the in-vehicle device to the transmitting unit. The duty ratio controller changes intensity of the signal transmitted from the transmission antenna by changing the energizing current according to the change of a prescribed duty ratio and forms a prescribed communication range.

According to any embodiments described above, it is demonstrated that the duty ratio controller, the modulating unit, and the signal combining unit, etc. are configured with hardware that combines a plurality of electronic parts. However, these elements may be configured not hardware but one microcomputer.

The antenna device according to the present invention can form the desired communication range having a high accuracy without changing resistance Ra of antenna constant. Therefore, it is useful to the antenna device that is used in the system that can unlock/lock the vehicle door.

What is claimed is:

1. An antenna device comprising:

a transmission antenna;

a transmitting unit which is connected to the transmission antenna and a control unit of an in-vehicle device mounted at a vehicle and operates the transmission antenna based on a binary signal and a carrier signal from the control unit, the transmitting unit including:

a duty ratio controller that modifies the binary signal to a duty ratio signal having a prescribed duty ratio and outputs the duty ratio signal; and a driving circuit that supplies an energizing current to the transmission antenna based on the carrier signal, wherein the duty ratio controller changes intensity of a signal transmitted from the transmission antenna by changing the energizing current according to the duty ratio signal so as to form a desired communication range.

2. The antenna device of claim 1, wherein the transmitting unit further includes a switching circuit which controls an energizing time of the transmission antenna depending on change of the duty ratio signal output from the duty ratio controller, and wherein the driving circuit is ON/OFF controlled by the carrier signal to supply the energizing current to the transmission antenna.

3. The antenna device of claim 1, wherein the transmitting unit further includes:

a modulating unit that modulates the carrier signal from the control unit of the in-vehicle device by the duty ratio signal, and outputs a modulated signal; and a signal combining unit that combines the modulated signal and the duty ratio signal, and outputs a combined signal, and wherein the driving circuit is ON/OFF controlled by the input of the modulated signal and the combined signal so as to control the energizing current of the transmission antenna.

4. The antenna device of claim 1, wherein the duty ratio controller including:

a storage unit that stores predetermined duty ratio information, and a duty ratio control unit that generates the duty ratio signal based on the predetermined duty ratio information and the binary signal from the control unit of the in-vehicle device.

5. The antenna device of claim 2, wherein the duty ratio controller including:

a storage unit that stores a predetermined duty ratio information, and a duty ratio control unit that generates the duty ratio signal based on the predetermined duty ratio information and the binary signal from the control unit of the in-vehicle device.

6. The antenna device of claim 3,
wherein the duty ratio controller including:
a storage unit that stores a predetermined duty ratio information, and
a duty ratio control unit that generates the duty ratio signal based on the predetermined duty ratio information and the binary signal from the control unit of the in-vehicle device.

7. The antenna device of claim 1,
wherein Q factor of the transmission antenna is set to 40 to 220.

8. The antenna device of claim 2,
wherein Q factor of the transmission antenna is set to 40 to 220.

9. The antenna device of claim 3,
wherein Q factor of the transmission antenna is set to 40 to 220.

10. The antenna device of claim 1, further comprising:
an attenuation circuit connected to the transmission antenna in parallel so as to attenuate a non-energizing current during a non-energizing time of the transmission antenna.

11. The antenna device of claim 2, further comprising:
an attenuation circuit connected to the transmission antenna in parallel so as to attenuate a non-energizing current during a non-energizing time of the transmission antenna.

12. The antenna device of claim 3, further comprising:
an attenuation circuit connected to the transmission antenna in parallel so as to attenuate a non-energizing current during non-energizing of the transmission antenna.

13. The antenna device of claim 12,
wherein the attenuation circuit includes a pair of switching circuits connected to the driving circuit in series and energizing elements provided at the pair of switching circuits in parallel, respectively.

14. The antenna device of claim 2,
wherein the transmitting unit further includes a current detecting circuit that detects the energizing current of the transmission antenna, and
the duty ratio controller changes the prescribed duty ratio of the duty ratio signal based on a detected signal of the current detecting circuit.

15. The antenna device of claim 3,
wherein the transmitting unit further includes a current detecting circuit that detects the energizing current of the transmission antenna, and
the duty ratio controller changes the prescribed duty ratio of the duty ratio signal based on a detected signal of the current detecting circuit.

* * * * *